(12) United States Patent
Suendermann

(10) Patent No.: US 6,627,036 B1
(45) Date of Patent: Sep. 30, 2003

(54) METHOD FOR GLUING PLASTIC OBJECTS WITH A HOT-MELT ADHESIVE

(75) Inventor: Franz Suendermann, Ruprechtshofen (AT)

(73) Assignee: Henkel Kommanditgesellschaft auf Aktien, Duesseldorf (DE)

(*) Notice: Subject to any disclaimer, the term of this patent is extended or adjusted under 35 U.S.C. 154(b) by 0 days.

(21) Appl. No.: 09/581,350

(22) PCT Filed: Dec. 9, 1998

(86) PCT No.: PCT/AT98/00298
§ 371 (c)(1),
(2), (4) Date: Oct. 4, 2000

(87) PCT Pub. No.: WO99/29491
PCT Pub. Date: Jun. 17, 1999

(30) Foreign Application Priority Data

Dec. 9, 1997 (AT) .................................. 2081/97

(51) Int. Cl.$^7$ .......................... B32B 31/12; B32B 31/26
(52) U.S. Cl. ................ 156/322; 156/304.1; 156/304.2; 156/304.3; 156/304.6
(58) Field of Search .................... 156/304.1, 304.2, 156/304.3, 304.4, 304.5, 304.6, 304.7, 304.9, 322

(56) References Cited

U.S. PATENT DOCUMENTS

| | | | |
|---|---|---|---|
| 3,279,971 A | * 10/1966 | Gardener | |
| 3,578,543 A | 5/1971 | Cook et al. | ............ 161/38 |
| 3,868,433 A | * 2/1975 | Bartz et al. | |
| 3,975,323 A | * 8/1976 | Georgoudis et al. | |
| 4,419,494 A | * 12/1983 | Puletti et al. | |
| 4,445,955 A | 5/1984 | Struve | ............ 256/153 |
| 4,771,161 A | 9/1988 | Levy et al. | ............ 219/228 |
| 4,807,910 A | 2/1989 | Johansson et al. | ............ 285/21 |
| 5,204,390 A | * 4/1993 | Szymanski et al. | |
| 5,262,479 A | * 11/1993 | Tobing | |
| 5,534,575 A | * 7/1996 | Foster et al. | |
| 5,981,035 A | * 11/1999 | Eshleman | ............ 156/304.4 X |

FOREIGN PATENT DOCUMENTS

| | | |
|---|---|---|
| DE | 34 03 036 | * 8/1985 |
| DE | 36 09 775 | 11/1986 |
| DE | 242 779 | 2/1987 |
| DE | 39 06 278 | 8/1990 |
| EP | 0 225 943 | 6/1987 |
| EP | 0 288 821 | 11/1988 |
| EP | 0 665 261 | 8/1995 |
| GB | 848 967 | 9/1960 |
| JP | 59 007016 | 1/1984 |
| JP | 06 155581 | 6/1994 |
| SU | 1 497 033 | 7/1989 |
| WO | WO 92/22419 | 12/1992 |
| WO | WO 94/16888 | 8/1994 |

OTHER PUBLICATIONS

Derwent Publication Ltd. London, GB Class A18, AN 94–221203 XP002098739.

Derwent Publications Ltd. London, GB Class A 35, AN 90–043348 XP002098740.

* cited by examiner

Primary Examiner—Curtis Mayes
(74) Attorney, Agent, or Firm—Stephen D. Harper; Gregory M. Hill

(57) ABSTRACT

In a method for bonding plastic objects together by means of a hot-melt type of adhesive, in addition to or during the heating and addition of a plasticizer-resistant hot-melt adhesive, at least one of the objects to be bonded, is heated up in the area to be bonded beyond the melting temperature of the material of which it is made. The method is particularly advantageous for the joining together of multi-layered plastic pipes. The result is the generation of a method for bonding objects by means of a hot-melt type of adhesive that can also be applied with materials for which it was hitherto impossible to apply hot-melt adhesion.

4 Claims, 1 Drawing Sheet

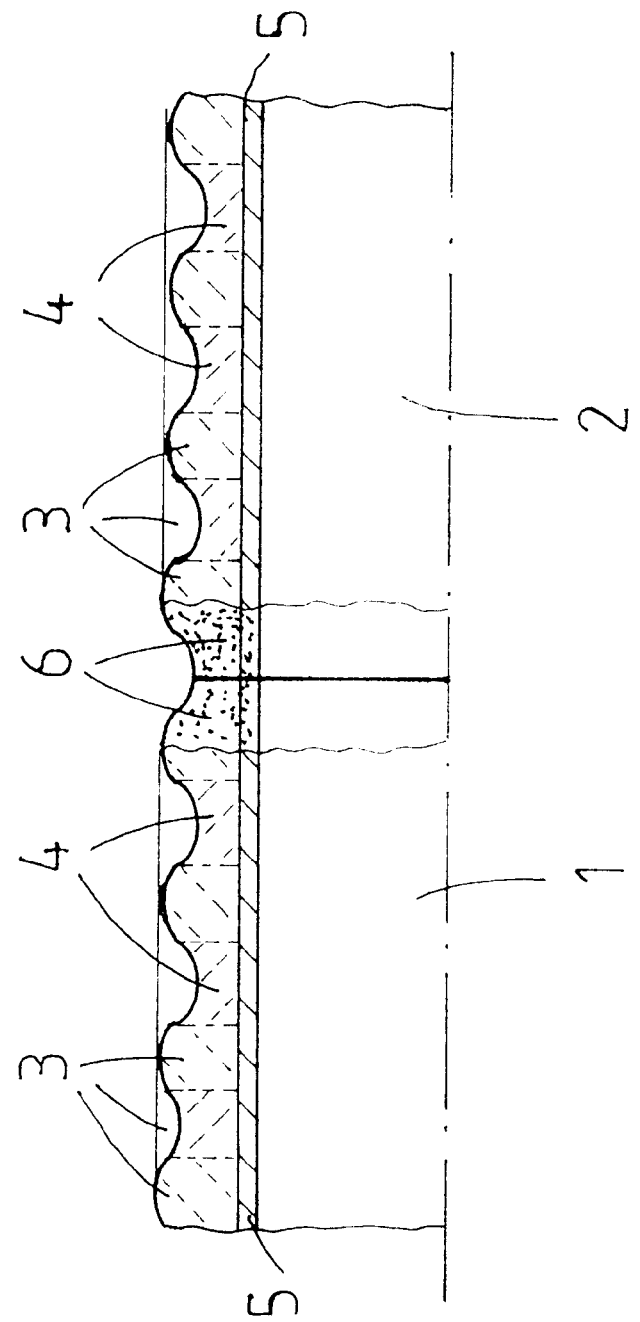

METHOD FOR GLUING PLASTIC OBJECTS WITH A HOT-MELT ADHESIVE

BACKGROUND OF THE INVENTION

1. Field of the Invention

The invention relates to a method for bonding plastic objects together using a hot-melt type of adhesive.

Objects made of all kinds of different materials are attached together by applying adhesives used in the shape of sticks, powders or slabs. All sorts of plastic materials, such as polyamides and polypropylenes, are used as the basis for these hot-melt adhesives. The objects are usually bonded together by applying the hot-melt adhesive in a heated, in other words free-flowing, condition to at least one of the surfaces to be bonded, which is at room temperature, after which the two surfaces to be bonded are pressed against each other. After a short cooling-off period, the two objects are then securely bonded together.

2. Description of Related Art

The process is already known whereby the hot-melt adhesive is first applied to the object, the hot-melt adhesive is then heated above its melting temperature and the two objects are then pressed together. This has been proposed for example for the bonding of floor coverings, in which the hot-melt adhesive is heated up through the floor covering. The floor covering itself was not heated up above its own respective melting temperature, however.

According to a further proposal, installation cases are bonded to the masonry by the process of first heating up the masonry and then attaching the cases by means of a hot-melt adhesive. Also in this case, the masonry's own melting temperature is not exceeded.

And yet all these methods are unsuitable for some materials, or the ultimate solidity achieved is not sufficient.

BRIEF SUMMARY OF THE INVENTION

The aim of the invention is to establish a method for bonding objects together using a hot-melt type of adhesive that can also be used with materials with which it was hitherto impossible to make use of hot-melt adhesion. This has been achieved by means of heating at least one of the objects to be bonded, in particular multi-layered pipes, in the area in which it is to be bonded to a temperature higher than the melting temperature of the material of which the object is made, in addition to or at the same time as heating and adding a plasticizer-resistant hot-melt type of adhesive.

DETAILED DESCRIPTION OF THE INVENTION

As experiments carried out have demonstrated, when the method according to the invention is applied, the components of the materials of the objects to be bonded on the one hand and the hot-melt adhesive on the other hand mix together in such a way that an homogeneous and thus also solid bond results. Any plasticizers that may be present, which would otherwise disturb the ability to bond, have no disadvantageous effect when the method according to the invention is applied. Even such materials as polyethylene (PE) can be bonded together using the method according to the invention.

Within the framework of the invention, it is possible to heat up at first at least one of the objects to be attached, in the area where it is to be bonded, until its temperature exceeds the melting temperature of the materials of which the object is made, and subsequently to introduce the hot-melt adhesive.

When materials are bonded that have such different melting points that there is a risk that when the higher melting point is reached, the material with the lower melting point could be destroyed, it is possible first to heat the one object in the area to be bonded so that its melting temperature is exceeded and then to mix it with the hot-melt adhesive flowing in, after which, in a second phase, the hot-melt adhesive that has already been cooled down after being mixed with the material of the first object is re-heated and bonded with the material of the second object.

It is also possible to execute the method according to the invention, however, in such a way that the hot-melt adhesive is heated up to such a temperature and for such a long time that the materials to be bonded melt and flow into the hot-melt adhesive.

There now follows a description of the invention in greater detail, with the aid of the embodiment illustrated in the drawing, although without the application of the method according to the invention being restricted to this embodiment.

BRIEF DESCRIPTION OF THE DRAWING

The drawing illustrates a section cut part of the way through a point at which two pipes are bonded.

In accordance with the drawing, two pipes 1 and 2 are connected together. These pipes is 1 and 2 have a multi-layered construction and are fitted, for the purpose of mechanical reinforcement, with screw-shaped components 3 stretching along their length and made of hard PVC. Between these "screws" 3 made of hard PVC are other components 4 made of soft PVC, which enable the pipes 1 and 2 to be deformed. Inside their structures, the pipes 1 and 2 contain an inner pipe 5 made of polyurethane.

The terminal areas 6 of the two pipes 1 and 2 are heated up above the melting temperatures at least of the components 3 and 4 and a hot-melt adhesive is introduced. In the area 6, the materials thus melted have mixed to such an extent that an homogeneous bond has taken place between pipes 1 and 2.

What is claimed is:

1. A method for bonding plastic objects together by means of a hot-melt adhesive, comprising in addition to or together with the heating and application of a plasticizer-resistant hot-melt adhesive, heating up a first object to be bonded in the area to be bonded above the melting temperature of the materials of which the object is made, subsequently applying the hot melt adhesive to the heated area of the first object, wherein the hot melt adhesive flows into and mixes with the heated area of the first object, and then bonding the first object with a second object.

2. The method of claim 1 wherein the first object is heated up in the area to be bonded beyond the melting temperature of the material of which it is made and then mixed with the hot-melt adhesive flowing in, after which in a second phase the hot-melt adhesive that has already been cooled down after mixing with the material of the first object is reheated and bonded with the material of the second object.

3. The method according to claim 1 wherein the hot-melt adhesive is heated up to such a temperature and for such a long time that the materials to be bonded melt and flow into the hot-melt adhesive.

4. The method according to claim 1 wherein the objects to be bonded comprise multi-layered pipe.

* * * * *